Figure 1:
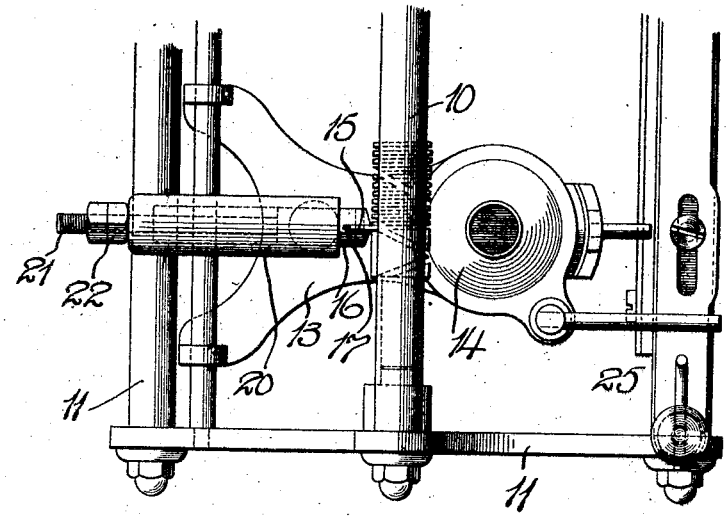

No. 880,100. PATENTED FEB. 25, 1908.
J. ROEVER.
CARRIAGE FEED FOR PHONOGRAPH MACHINES.
APPLICATION FILED JUNE 10, 1907.

WITNESSES:

INVENTOR.
Julius Roever.
BY W. P. Hutchinson,
ATTORNEY.

UNITED STATES PATENT OFFICE.

JULIUS ROEVER, OF NEW YORK, N. Y., ASSIGNOR TO NATIONAL PATENT COMPANY, OF NEW YORK, N. Y., A CORPORATION OF NEW YORK.

CARRIAGE-FEED FOR PHONOGRAPH-MACHINES.

No. 880,100.     Specification of Letters Patent.     Patented Feb. 25, 1908.

Application filed June 10, 1907. Serial No. 378,062.

*To all whom it may concern:*

Be it known that I, JULIUS ROEVER, of the city of New York, county of Kings, and State of New York, have invented a new and useful Improvement in Carriage-Feeds for Phonograph-Machines, of which the following is a full, clear, and exact description.

My invention relates to improvements in phonographs, and especially to that class of phonograph machines in which a feed screw is used for working a reproducer and its carriage backward and forward with relation to a record. In machines of this type, a screw having threads of opposite pitch is used, and a blade is generally arranged to follow the screw and transmit motion to the carriage with which the blade is connected. Heretofore in structures of this kind, there has been a difficulty because of the fact that the blade or its connected mechanisms would some times catch a little, and every little catch or imperfect movement is transmitted to the reproducer, or at least affects the easy movement of the reproducer so that the tone quality of the instrument is injured.

The object of my invention is to remedy this difficulty and produce an attachment which will be sufficiently rigid to cause a positive feed of the reproducer carriage, but which will also be sufficiently elastic and yielding to adapt itself to any slight imperfections of the screw or any imperfect movements of any of the mechanism. In other words, my invention is intended to construct the screw connection of the feed so that it will absolutely follow the thread of the screw at a uniform rate, and without any halts in the movement.

With these ends in view, my invention consists of certain features of construction and combinations of parts which will be hereinafter described and claimed.

Reference is to be had to the accompanying drawing forming a part of this specification, in which similar reference characters indicate corresponding parts in all the views.

Figure 2:
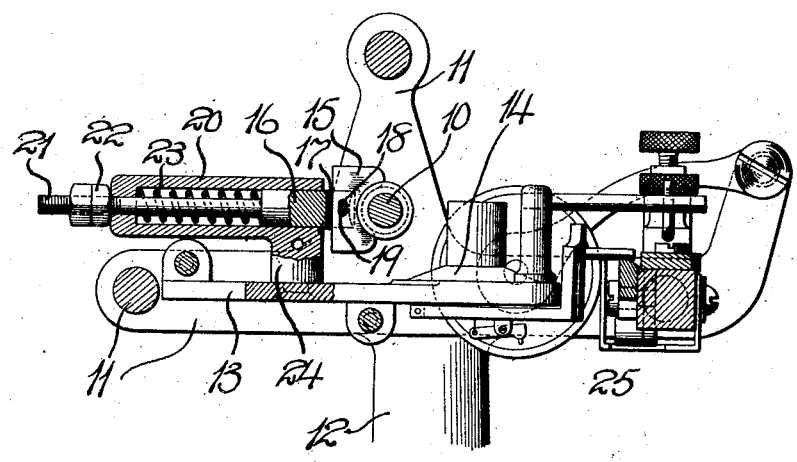

Figure 1 is a broken plan view of a phonograph machine provided with my improvements, and Fig. 2 is a sectional elevation thereof with the feed connection shown partly in longitudinal section.

I have shown my improvement in connection with a feed screw 10, which is only shown threaded for a part of the way, but this screw lies parallel with the record of the machine, which is not here shown, and has threads of opposite pitch. The screw shaft 10 is mounted on a horizontal frame 11, which can be of any approved type, and this is supported on a post 12, and the frame affords a support for the sliding carriage 13, which carries the reproducer 14, and my invention lies in the connection between this carriage 13 and the screw shaft 10. The immediate connection with the screw is by a blade 15, not dissimilar to blades heretofore used on machines of this character, but the blade is yieldingly supported on a plunger 16, the latter being slotted vertically as shown at 17, and the blade is also provided with a slot 18 which receives a pin 19, and thus it will be seen that the blade 15 can move in the slot 17, while it has also a bodily movement with the plunger 16, which latter is held in the casing 20, and is backed by a spring 23, as shown. It will thus be seen that I do not rely merely on the resiliency of the blade 15, which should be of spring material, or even on the resiliency of the blade and spring 23, but I get a flexible movement of the blade with relation to its support, which is also spring pressed and the blade is very sensitive and will follow the thread of the screw at all times.

The plunger 16 has a shank 21 which extends through the outer end of the casing 20, and is screw threaded so as to receive the nuts 22, by means of which the plunger can be adjusted and locked and the tension of the spring 23 regulated. The casing 20 can be connected with the carriage 13 in any convenient way, but I have shown it secured to a post 24 which is fastened to the carriage.

The mechanism shown at 25 at the right hand of the carriage is for regulating the stylus of the reproducer, and has nothing to do with this present invention, therefore it is not described in detail.

It will be seen that the connection between the carriage and the screw is extremely flexible and yet sufficiently positive, and it will be understood that the means for supporting the plunger 16 and connecting it with the carriage, can be varied considerably if desired, without affecting the principle of the invention, though I claim the peculiar support and arrangement of the plunger.

Having thus fully described my invention,

I claim as new and desire to secure by Letters Patent:—

1. In a machine of the kind described, the combination with the feed screw and carriage, of a spring pressed support on the carriage, and a blade yieldingly mounted on the support and arranged to connect with the screw.

2. The combination with the feed screw and carriage, of a support yieldingly connected with the carriage, and a blade mounted on the support so as to have a limited movement in relation thereto, said blade being arranged also to engage the thread of the screw.

3. The combination with the feed screw and the carriage, of a slotted support yieldingly mounted on the carriage, and a blade to engage the screw, said blade being mounted in the slot of the support and having a limited movement in the said slot.

4. The combination with the feed screw and the carriage, of a casing, a spring pressed plunger mounted in the casing, and a blade supported on the plunger so as to have a limited movement in relation thereto, said blade being also arranged to engage the screw.

JULIUS ROEVER.

Witnesses:
WARREN P. HUTCHINSON,
FRANK L. STUBBS